United States Patent
Krog

[15] 3,667,514
[45] June 6, 1972

[54] GUIDING CIRCULAR SAWS

[72] Inventor: Oliver E. Krog, Richmond, British Columbia, Canada

[73] Assignee: Canadian Forest Products Ltd., British Columbia, Canada

[22] Filed: Jan. 22, 1970

[21] Appl. No.: 4,817

[30] Foreign Application Priority Data

Jan. 5, 1970 Canada ................................... 071,340

[52] U.S. Cl. ........................ 143/37 R, 143/160, 143/160 G
[51] Int. Cl. ........................................................ B27b 5/34
[58] Field of Search ............... 143/160, 160.8, 165, 37, 155, 143/56, 166

[56] References Cited
UNITED STATES PATENTS

| | | |
|---|---|---|
| 261,645 | 7/1882 | Winter .................................... 143/160 |
| 3,285,302 | 11/1966 | Thrasher ............................. 143/56 X |
| 2,126,987 | 8/1938 | Criner .................................. 143/160 X |
| 1,260,837 | 3/1918 | Walker et al. ......................... 143/160 |
| 1,203,940 | 11/1916 | Trout ................................... 143/37 X |
| 3,580,305 | 5/1971 | Wright ................................... 143/37 |

Primary Examiner—Andrew R. Juhasz
Assistant Examiner—James F. Coan
Attorney—Fetherstonhaugh & Co.

[57] ABSTRACT

A guide for a circular saw comprising a pair of guide elements each with a guide surface for guiding the saw or saws, the spacing between the surfaces being adjustable either by cams or wedges movable between the two elements.

8 Claims, 5 Drawing Figures

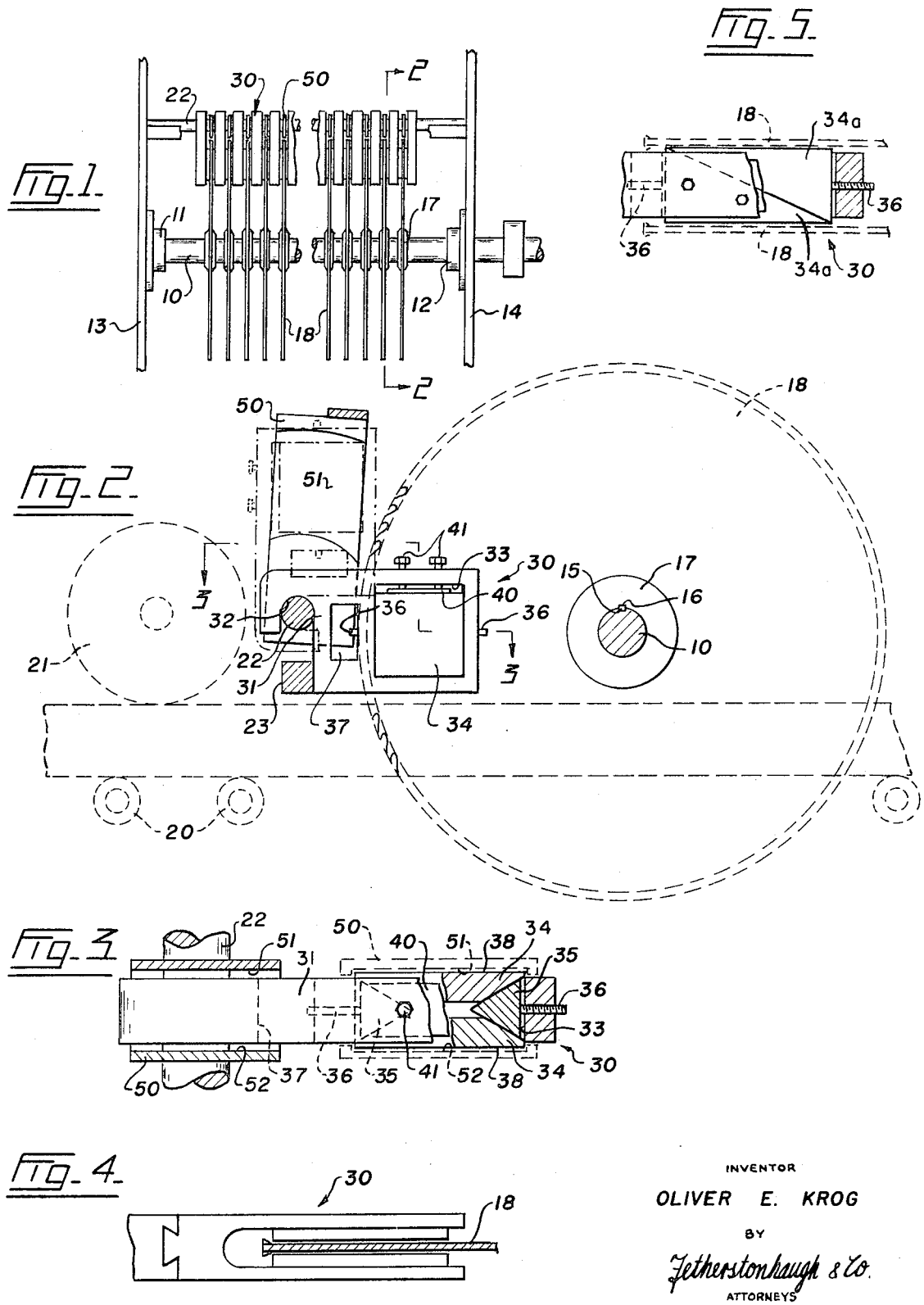

GUIDING CIRCULAR SAWS

BACKGROUND OF THE INVENTION

This invention is concerned with guiding circular saws of the kind which are mounted to rotate with an arbor and which maybe axially movable on the arbor.

In recent years and with the rising cost of lumber, it has become increasingly important that the wastage in saw mills be reduced. Attempts have been made to achieve this end by more accurate sawing using saw blades with reduced thicknesses and consequently obtaining smaller kerfs.

One such attempt is described in U.S. Pat. No. 3,285,302 issued Nov. 15, 1966 to Elbridge W. Thrasher.

In that patent there is described a system in which saw guides are located close to the periphery of the saw blades and the saw blades are free to move on their arbor. In this way, rather than having to rely on the inherent rigidity of a saw which is axially fixed on the arbor, i.e., a necessarily thick saw, one is able to use a thinner saw and by establishing the cutting plane at the periphery of the saw blade one can closely control the cut whilst allowing the blade to flex as necessary.

In the aforementioned patent it is suggested that the contacting surfaces of the guide be formed by replaceable guide blocks of plywood or other materials and in practice the patentee has been obliged to resort to the use of babbitt faced guide blocks because of the dimensional instability of plywood.

To replace the babbitt guide blocks the guides must be removed from the saw, the babbitt melted, replaced, and then accurately machined. This, clearly, is a costly and time consuming procedure.

It is an object of this invention to provide a simple and easily operable guide for circular saws which avoids or alleviates this problem. The invention also provides a machine incorporating the guide.

SUMMARY OF THE INVENTION

From one aspect of this invention there is provided a guide for a circular saw machine comprising two guide elements which define spaced apart blade guiding surfaces and the guide elements being adjustable to vary the spacing between the surfaces.

It is to be appreciated that the guide surfaces may guide adjacent surfaces of two circular saw blades mounted on a common arbor or they may be arranged to guide opposite sides of the single saw blade. In the first arrangement it will be understood the spacing of the guide surfaces is related to the required thickness of the lumber to be cut whereas in the second, the spacing of those surfaces would be related to the blade thickness and to establish the cut to be made in a multi-bladed sawing machine the spacing of the guides would be established.

Preferably the means for adjusting the spacing of the blade guiding surfaces comprise a wedging element movable between the guide elements. The wedging element may take the form of a rotatable cam acting between the surfaces or it may take the form of a tapered wedge movable between the guide elements. Alternatively the two guide elements may be formed with matching inclined surfaces so that movement of the guide elements relatively to each other other varies the spacing of the saw guiding surfaces.

From another aspect of this invention there is provided a guide for maintaining the spacing of two circular saw blades comprising a support located between the blades, a pair of guide elements each guide element having a guide surface for guiding an appropriate one of the saws and a wedging element movable relative to the support between the guide elements to vary the spacing of the guide surfaces.

From another aspect there is provided a guide for maintaining the spacing of two circular saw blades comprising a support located between the blades, a pair of guide elements each guide element having a guide surface for guiding an appropriate one of the saws and the guide elements having matching inclined surfaces so that movement of one element relatively to the other in a plane parallel to the guide surfaces changes the spacing of those surfaces.

Preferably the guide elements are mounted to be movable between an operative, blade guiding position and an inoperative position. In the inoperative position there may be located a jig having reference surfaces set to the spacing required of the guide surfaces into which or onto which the guide element is located. At this position the wedging element could be operated to cause the guiding surfaces of the guide elements to conform to appropriate reference surfaces on the jig and the guide elements could then be locked into that position and returned to the operative position.

It is to be appreciated that the guide elements of this invention can be of cheap and easily replaceable material such as for example lignum vitae, composition materials or metals.

BRIEF DESCRIPTION OF THE DRAWINGS

FIG. 1 is a plan view of a typical machine embodying this invention,

FIG. 2 is a section on the line 2—2 of FIG. 1 drawn on an enlarged scale,

FIG. 3 is a section on the line 3—3 of FIG. 2, and

FIG. 4 is a view similar to the view of FIG. 3 but on a different guide,

FIG. 5 is an alternative embodiment of the guide.

DESCRIPTION OF THE PREFERRED EMBODIMENTS

The machine illustrated in FIG. 1 is an edger having an arbor 10 mounted for rotation in bearings 11 and 12 on frame members 13 and 14 respectively. The arbor is driven in known manner.

The arbor has a keyways 15 (see FIG. 2) with which a key 16 on collars 17 of circular saws 18 cooperates so that the saw blades are rotatable with the arbor but are axially movable therealong.

As can be seen from FIG. 2 the edger is of the top arbor kind having a work supporting platform constituted by rollers 20 upon which lumber moves from left to right as viewed in FIG. 2 below the arbor 10. A top roller 21 holds the lumber in place on the platform during cutting.

Extending between the roller 21 and the saw blades and parallel to the arbor is a shaft 22 upon which guides indicated generally at 30 are mounted to be pivoted between the positions shown in full and chain dot line in FIG. 2. A beam 23 extends below the shaft 22 and provides an abutment to prevent rotation of the guide 30 clockwise (as viewed in FIG. 2) from its operative, saw guiding, position as shown in full line.

Each of the guide elements illustrated in FIGS. 2 and 3 comprises a support 31 of generally rectangular outline having a cut away section at its lowermost left hand corner which defines a part circular bearing surface 32 for cooperation with the shaft 22 to allow the pivotal movement of the guide from its operative position to its inoperative position. Alternatively and perhaps preferably the guide blocks can be removed completely from the machine for adjustment and replacement.

At the end of the guide closest to the arbor 10 there is an opening 33 formed through the support and within that opening are located a pair of guide elements 34.

The opening 33 is square or rectangular and at two opposite edges of the opening there are located triangular sectioned wedges 35 which are adjustably supported on bolts 36 which are rotatable in corresponding screw threaded bushes in the support 31 so that the extent to which the wedges 35 extend into the opening and between the guide elements can be varied by rotation of the bolts 36. The bolts may be Allen bolts having hexagonal wrench sockets in their ends and access is had to the wrench socket of the bolt closest to shaft 32 by forming a window 37 through the support, see FIG. 2. Alternatively access could be had to the bolt by forming a hole right through the support.

The guide elements 34 are arranged back to back within the opening 33 and at their edges adjacent to the wedge 35 are chamferred to provide surfaces inclined correspondingly to the inclined faces of the wedges 35 so that movement of the wedges 35 towards each other causes the guide elements 34 to be spaced further apart and movement of the wedges away from each other allows the guide elements to be more closely spaced. It may in many instances be necessary or desirable to join the guide elements 34 together in some flexible manner to prevent their inadvertent removal from the openings 33.

Each guide element 34 has a blade contacting and guiding surfaces 38 each of which is adapted in this embodiment to guide one of the adjacent sides of two circular saw blades on the arbor. It will be appreciated that the spacing of the surfaces 38 will dictate the location of the cuts made by the two adjacent circular saw blades.

To lock the guide elements once their spacing has been adjusted there is provided a clamping plate 40 at one side of the opening 33 normal to those sides from which the wedges 35 project. The clamping plate is adapted to extend over a substantial portion of the adjacent end faces of the guide elements 34 and is movable towards and away from the sides of the opening by means of bolts 41 which are rotatable within bushes in the support 31.

Located above the shaft 22 is a jig 50 which has reference surfaces 51 and 52 which are set to the required thickness to which it is desired to cut the lumber. To adjust the spacing of the guide elements 34 the support is swung from the position shown in full line in FIG. 2 to the position shown in chain dot line in FIG. 2. In this position the guide blocks are located between the reference surfaces 51 and 52 of the jig. The bolts 41 are then turned to release the guide elements 34 from constraint by the clamping plate 40 and then the bolts 36 are turned to bring the wedges 35 towards each other and the guide surfaces 38 of the guide elements 34 into intimate contact with the reference surfaces 51 and 52. The clamping element is then turned down to secure the guiding elements in their adjusted position and the guide is then reset. Because of the duty conditions in the immediate vicinity of the sawing operation it may be desirable to locate the jig at some remote positon and remove the guides from the machine for adjustment.

FIG. 5 illustrates an alternative method of adjusting the spacing of the guiding surfaces in this embodiment the guide elements 34a are themselves of wedge shape so that relative movement of the elements by means of bolts 36 in the plane of the guide surfaces varies the spacing between the outer surfaces thereof.

It is to be appreciated that the present invention provides a simple and economical method of adjusting the guides in circular saw machines. It is also to be understood that the invention is subject to various modifications which do not deviate from its scope. For example the embodiment illustrated in the drawings could be modified by replacing the wedges 35 with a wedging element extending between and parallel to the back faces of the guide elements 34 and rotatable about its longitudinal axis, the wedging element being eccentric about that axis to "cam" the guiding elements apart. Conveniently the wedging element may be rotable in a slot normal to the guide surfaces so as to be self centering. Alternatively it would be possible to provide other means of adjusting the spacing of the guiding surfaces as for example the provision of a bolt extending normal to the guide surfaces and an access opening through one of those elements to facilitate rotation of the screw threaded bolt.

To obtain lubrication of the guide surface water may be directed to them in known fashion or preferable appropriate passages can be formed through the support and the guide elements which open into closed ended grooves or the guide surface to maintain a film of water between the surfaces of the guide members and blades. This system is to be preferred because it requires very much less lubricant than the first mentioned and of course the wood is not wetted to the same extent.

Whilst the embodiment of the invention illustrated is a top arbor machine which is "climb" cutting, clearly the invention is applicable to both top and bottom arbor machines which can "climb" cut or opposed "cut."

I claim:

1. A guide for circular saws comprising a support, two guide elements movably mounted side by side on the support and having large flat and parallel outer guide surfaces facing outwardly from opposite sides of the support, opposed wedges extending along two opposite edges of the guide elements and projecting inwardly between the latter, said two opposite edges of the elements being formed with inwardly extending wedge surfaces to cooperate with the wedges, said opposed wedges being shiftable towards each other to shift the guide elements outwardly relative to the support to compensate for wear in the outer guide surfaces and maintain the parallel relationship of said surfaces, and means for releasably securing the guide elements on the support.

2. A guide as claimed in claim 1 including means for individually shifting each of said wedges towards the other of said wedges selectively to shift the guide elements outwardly from said opposite edges thereof.

3. A guide as claimed in claim 2 in which said support includes a frame having four sides within which the guide elements are positioned, and said means for individually shifting each wedge comprises a bolt threaded through the adjacent frame side and bearing against said each wedge to shift the latter inwardly of the frame while allowing said each wedge to tilt in a longitudinal direction.

4. In a circular saw machine having an arbor and at least two spaced circular saw blades mounted for rotation with the arbor and axially movable therealong, a guide comprising a support extending between the saw blades, two guide elements movably mounted side by side on the support and having large flat and parallel outer blade guiding surfaces facing outwardly from opposite sides of the support, said guide elements being located close to the peripheries of the saw blades and the guiding surfaces thereof lying in planes generally normal to the arbor, opposed wedges extending along two opposite edges of the guide elements and projecting inwardly between the latter, said two opposite edges of the elements being formed with inwardly extending wedge surfaces to cooperate with the wedges, said opposed wedges being shiftable towards each other to shift the guide elements outwardly relative to the support and towards the blades to compensate for wear caused by the saw blades in the outer guide surfaces and maintain the parallel relationship of said surfaces, and means for releasably securing the guide elements on the support.

5. A machine as claimed in claim 4 including means for individually shifting each of said wedges towards the other of said wedges selectively to shift the guide elements outwardly from said opposite edges thereof.

6. A machine as claimed in claim 4 in which said support includes a frame having four sides within which the guide elements are positioned, and said means for individually shifting each wedge comprises a bolt threaded through the adjacent frame side and bearing against said each wedge to shift the latter inwardly of the frame while allowing said each wedge to tilt in a longitudinal direction.

7. A circular saw machine comprising an arbor and at least two circular saw blades mounted for rotation with the arbor and axially movable therealong, a guide comprising a support movable between a saw guiding position between the blades and a guide setting position, said guide having two guide elements each defining a blade guiding surface adapted, in use, to guide the blade close to its periphery, said surfaces being spaced apart, parallel and lying in planes generally normal to the arbor, means for adjusting the spacing of the guide elements while maintaining said guiding surfaces in parallel relationship, means for clamping the guide elements in an adjusted position relative to the support, and a jig at the guide setting position with reference surfaces set at the desired spacing of the saw contacting surfaces of the guide.

8. A guide for a circular saw comprising a support frame, two guide elements movably mounted in the frame and having large flat and parallel guide surfaces spaced from each other, gripping means for releasably fixing the guide elements in the frame, and adjusting means for moving said elements on the frame to shift the guide surfaces relative to each other while maintaining said surfaces in parallel relationship, said adjusting means comprising correspondingly tapered surfaces on the guide elements and bearing against each other, and means for shifting said elements longitudinally of the tapered surfaces and relative to each other.

* * * * *